(12) United States Patent
Liu et al.

(10) Patent No.: US 12,380,864 B2
(45) Date of Patent: Aug. 5, 2025

(54) BACKLIGHT CALIBRATION METHOD AND DEVICE, AND COMPUTER EQUIPMENT

(71) Applicant: TCL China Star Optoelectronics Technology Co., Ltd., Guangdong (CN)

(72) Inventors: Lu Liu, Guangdong (CN); Youngil Ban, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 0 days.

(21) Appl. No.: 17/623,683

(22) PCT Filed: Dec. 21, 2021

(86) PCT No.: PCT/CN2021/140180
§ 371 (c)(1),
(2) Date: Dec. 29, 2021

(87) PCT Pub. No.: WO2023/103085
PCT Pub. Date: Jun. 15, 2023

(65) Prior Publication Data
US 2024/0371332 A1 Nov. 7, 2024

(30) Foreign Application Priority Data
Dec. 10, 2021 (CN) .......................... 202111507872.3

(51) Int. Cl.
*G09G 3/34* (2006.01)
(52) U.S. Cl.
CPC ... *G09G 3/3406* (2013.01); *G09G 2320/0693* (2013.01)

(58) Field of Classification Search
CPC .............. G09G 3/3406; G09G 3/3413; G09G 2320/0693
See application file for complete search history.

(56) References Cited

U.S. PATENT DOCUMENTS

| | | | |
|---|---|---|---|
| 2012/0139885 A1 | 6/2012 | Iwasa et al. | |
| 2018/0136737 A1 | 5/2018 | Amarilio et al. | |
| 2019/0197971 A1 | 6/2019 | Zha | |
| 2020/0168169 A1* | 5/2020 | Yoda .................... | G09G 3/3648 |
| 2020/0382740 A1 | 12/2020 | Zhou et al. | |

FOREIGN PATENT DOCUMENTS

| | | |
|---|---|---|
| CN | 102332242 | 1/2012 |
| CN | 202632691 | 12/2012 |
| CN | 106782431 | 5/2017 |
| CN | 108172175 | 6/2018 |

(Continued)

*Primary Examiner* — Dennis P Joseph

(57) ABSTRACT

A backlight calibration method and device, and a computer equipment are provided. Wherein, the method is used in the display equipment. A detector disposed toward backlight sources of the display equipment to detect backlight parameters of the display equipment is disposed in the display equipment. The method includes obtaining backlight parameters of the display equipment; determining a backlight type corresponding to the backlight parameters; and performing backlight calibration on the display equipment according to the backlight type. A technical problem of easily misusing the parameters during backlight calibration in the prior art is solved.

14 Claims, 9 Drawing Sheets

(56) References Cited

FOREIGN PATENT DOCUMENTS

| | | |
|---|---|---|
| CN | 109151217 | 1/2019 |
| CN | 109637461 | 4/2019 |
| CN | 109725464 | 5/2019 |
| CN | 110874199 | 3/2020 |
| CN | 111028792 | 4/2020 |
| CN | 112365550 | 2/2021 |
| CN | 112382242 | 2/2021 |
| CN | 112530372 | 3/2021 |
| CN | 112599512 | 4/2021 |
| CN | 112927647 | 6/2021 |
| CN | 113223466 | 8/2021 |
| CN | 113539189 | 10/2021 |
| CN | 113554990 | 10/2021 |
| JP | 2005-249891 | 9/2005 |

\* cited by examiner

BACKLIGHT CALIBRATION METHOD AND DEVICE, AND COMPUTER EQUIPMENT

RELATED APPLICATIONS

This application is a National Phase of PCT Patent Application No. PCT/CN2021/140180 having International filing date of Dec. 21, 2021, which claims the benefit of priority of Chinese Patent Application No. 202111507872.3 filed on Dec. 10, 2021. The contents of the above applications are all incorporated by reference as if fully set forth herein in their entirety.

FIELD AND BACKGROUND OF THE INVENTION

The present application relates to a display field, and specifically to a backlight calibration method and device, and a computer equipment.

With development of technology, mini liquid crystal display (mini-LCD) backlights are adopted more and more in LCD devices on the market. Meanwhile, traditional backlights of using a single large backlight or a plurality of small partial backlights are still in use. However, because luminous efficacy of the mini-LED backlights is higher, LCD panels can have higher brightness when using the mini-LED backlights, resulting in parameters used in backlight calibration of LCD display modules under the two backlights being different. If parameters corresponding to the traditional backlight are used in the display modules with the mini-LED backlights, resulting in color washout of overall screens finally presented.

Currently, because every manufacturer does produce the aforesaid two kinds of backlight display modules simultaneously, the parameters can be misused during backlight calibration, resulting in a problem appearing in final display effect of the display modules.

SUMMARY OF THE INVENTION

Embodiments of the present application provide a backlight calibration method and device, and a computer equipment, which can solve a technical problem of easily misusing parameters during backlight calibration in the prior art.

One embodiment of the present application provides a backlight calibration method used in display equipment. A detector is disposed in the display equipment. The detector is disposed toward backlight sources of the display equipment to detect backlight parameters of the display equipment. The method includes obtaining the backlight parameters of the display equipment; determining a backlight type corresponding to the backlight parameters; and performing backlight calibration on the display equipment according to the backlight type.

Optionally, the detector is disposed on a backlight control board of the display equipment, the backlight control board is disposed in a non-display region of the display equipment, and the display equipment includes a plurality of backlight sources. Obtaining the backlight parameters of the display equipment specifically includes: driving all the backlight sources in a predetermined region directly faced by the detector; and obtaining a bright image of the predetermined region.

Optionally, determining the backlight type corresponding to the backlight parameters specifically includes: if the bright area proportion is less than a predetermined proportion threshold value, then the bright area proportion corresponds to a first backlight type; and if the bright area proportion is greater than the predetermined proportion threshold value, then the bright area proportion corresponds to a second backlight type.

Optionally, the backlight parameters include backlight brightness. Determining the backlight type corresponding to the backlight parameters includes: if the backlight brightness is greater than a predetermined brightness threshold value, then the backlight brightness corresponds to a first backlight type; and if the backlight brightness is less than the predetermined brightness threshold value, then the backlight brightness corresponds to a second backlight type.

Optionally, the backlight parameters include a backlight temperature. Determining the backlight type corresponding to the backlight parameters includes: if the backlight temperature is greater than a predetermined temperature threshold value, then the backlight temperature corresponds to a first backlight type; and if the backlight temperature is less than the predetermined temperature threshold value, then the backlight temperature corresponds to a second backlight type.

Optionally, the backlight parameters include backlight brightness and a backlight temperature. Determining the backlight type corresponding to the backlight parameters includes if the backlight brightness is greater than a predetermined brightness threshold value and the backlight temperature is greater than the predetermined temperature threshold value, then the backlight brightness corresponds to a first backlight type; and if the backlight brightness is less than the predetermined brightness threshold value and the backlight temperature is less than the predetermined temperature threshold value, then the backlight brightness corresponds to a second backlight type.

Optionally, performing the backlight calibration on the display equipment according to the backlight type specifically includes: if the backlight type is the first backlight type, then the backlight calibration is performed by a first backlight calibration parameter; and if the backlight type is the second backlight type, then the backlight calibration is performed by a second backlight calibration parameter, and wherein the first backlight calibration parameter is less than the second backlight calibration parameter.

On another aspect, the present application provides a backlight calibration device. A detector is disposed in the display equipment. The detector is disposed toward backlight sources of the display equipment to detect backlight parameters of the display equipment. The backlight calibration device includes: an obtaining module configured to obtain the backlight parameters of the display equipment; a determination module configured to determine a backlight type corresponding to the backlight parameters; and a calibration module configured to perform backlight calibration on the display equipment according to the backlight type.

Optionally, the detector is disposed on a backlight control board of the display equipment, and the backlight control board is disposed in a non-display region of the display equipment. The obtaining module specifically includes: a driving unit configured to drive all the backlight sources in a predetermined region directly faced by the detector; an obtaining unit configured to obtain a bright image of the predetermined region; and a determining unit configured to determine the backlight parameters according to the bright image.

Optionally, the determination module specifically includes: a first proportion corresponding unit configured to make the bright area proportion correspond to a first backlight type, if the bright area proportion is less than a predetermined proportion threshold value; and a second proportion corresponding unit configured to make the bright area proportion correspond to a second backlight type, if the bright area proportion is greater than the predetermined proportion threshold value.

Optionally, the backlight parameters include backlight brightness. The determination module specifically includes: a first brightness corresponding unit configured to make the backlight brightness correspond to a first backlight type if the backlight brightness is greater than a predetermined brightness threshold value; and a second brightness corresponding unit configured to make the backlight brightness correspond to a second backlight type if the backlight brightness is less than the predetermined brightness threshold value.

Optionally, the backlight parameters include a backlight temperature. The determination module specifically includes a first temperature corresponding unit configured to make the backlight temperature correspond to a first backlight type, if the backlight temperature is greater than a predetermined temperature threshold value; and a second temperature corresponding unit configured to make the backlight temperature correspond to a second backlight type, if the backlight temperature is less than the predetermined temperature threshold value.

Optionally, the backlight parameters include backlight brightness and a backlight temperature. The determination module specifically includes: a first comprehensively corresponding unit configured to make the backlight brightness correspond to a first backlight type, if the backlight brightness is greater than a predetermined brightness threshold value and the backlight temperature is greater than the predetermined temperature threshold value; a second comprehensively corresponding unit configured to make the backlight brightness correspond to a second backlight type, if the backlight brightness is less than the predetermined brightness threshold value and the backlight temperature is less than the predetermined temperature threshold value.

Optionally, the calibration module specifically includes: a first calibration unit configured to perform the backlight calibration by a first backlight calibration parameter, if the backlight type is the first backlight type; and a second calibration unit configured to perform the backlight calibration by a second backlight calibration parameter, if the backlight type is the second backlight type; and wherein the first backlight calibration parameter is less than the second backlight calibration parameter.

On another aspect, the present application further provides a computer equipment. The computer equipment includes: one or a plurality of processor; a storage appliance; and one or a plurality of application program, where in the one or the plurality of application program is stored in the storage appliance and is configured to execute following steps by the processor: obtaining the backlight parameters of the display equipment; determining a backlight type corresponding to the backlight parameters; and performing backlight calibration on the display equipment according to the backlight type.

Optionally, the detector is disposed on a backlight control board of the display equipment, the backlight control board is disposed in a non-display region of the display equipment, and the display equipment includes a plurality of backlight sources. In the step of obtaining the backlight parameters of the display equipment, the processor execute following steps: driving all the backlight sources in a predetermined region directly faced by the detector; obtaining a bright image of the predetermined region; and determining the backlight parameters according to the bright image.

Optionally, the backlight parameters include a bright area proportion. In the step of determining the backlight type corresponding to the backlight parameters, the processor execute following steps: if the bright area proportion is less than a predetermined proportion threshold value, then the bright area proportion corresponds to a first backlight type; and if the bright area proportion is greater than the predetermined proportion threshold value, then the bright area proportion corresponds to a second backlight type.

Optionally, the backlight parameters include backlight brightness. In the step of determining the backlight type corresponding to the backlight parameters, the processor execute following steps: if the backlight brightness is greater than a predetermined brightness threshold value, then the backlight brightness corresponds to a first backlight type; and if the backlight brightness is less than the predetermined brightness threshold value, then the backlight brightness corresponds to a second backlight type.

Optionally, the backlight parameters include a backlight temperature. In the step of determining the backlight type corresponding to the backlight parameters, the processor execute following steps: if the backlight temperature is greater than a predetermined temperature threshold value, then the backlight temperature corresponds to a first backlight type; and if the backlight temperature is less than the predetermined temperature threshold value, then the backlight temperature corresponds to a second backlight type.

Optionally, the backlight parameters include backlight brightness and a backlight temperature. In the step of determining the backlight type corresponding to the backlight parameters, the processor execute following steps: if the backlight brightness is greater than a predetermined brightness threshold value and the backlight temperature is greater than the predetermined temperature threshold value, then the backlight brightness corresponds to a first backlight type; and if the backlight brightness is less than the predetermined brightness threshold value and the backlight temperature is less than the predetermined temperature threshold value, then the backlight brightness corresponds to a second backlight type.

On another aspect, the present application further provides a computer readable storage medium, in which a computer program is stored. The computer program is loaded by the processor to execute the steps in the backlight calibration method.

Type here a paragraph describing the beneficial effect. In the embodiments of the present application, by judging whether the backlight type adopted in the display equipment is a traditional backlight type or a mini-LED backlight type through the backlight parameters of the display equipment, and by determining the backlight calibration parameters according to the different backlight types, when the backlight is a traditional backlight, the traditional backlight type is adopted to perform backlight calibration on the display equipment; and when the backlight is the mini-LED backlight, the new backlight type is adopted to perform backlight calibration on the display equipment, i.e., the technical problem of easily misusing the parameters during backlight calibration in the prior art is solved.

BRIEF DESCRIPTION OF THE SEVERAL VIEWS OF THE DRAWINGS

To more clearly illustrate the technical solutions of the embodiments of the present application, the accompanying figures of the present invention will be described in brief. Obviously, the accompanying figures described below are only part of the embodiments of the present invention, from which figures those skilled in the art can derive further figures without making any inventive efforts.

DESCRIPTION OF SPECIFIC EMBODIMENTS OF THE INVENTION

Figure 1:
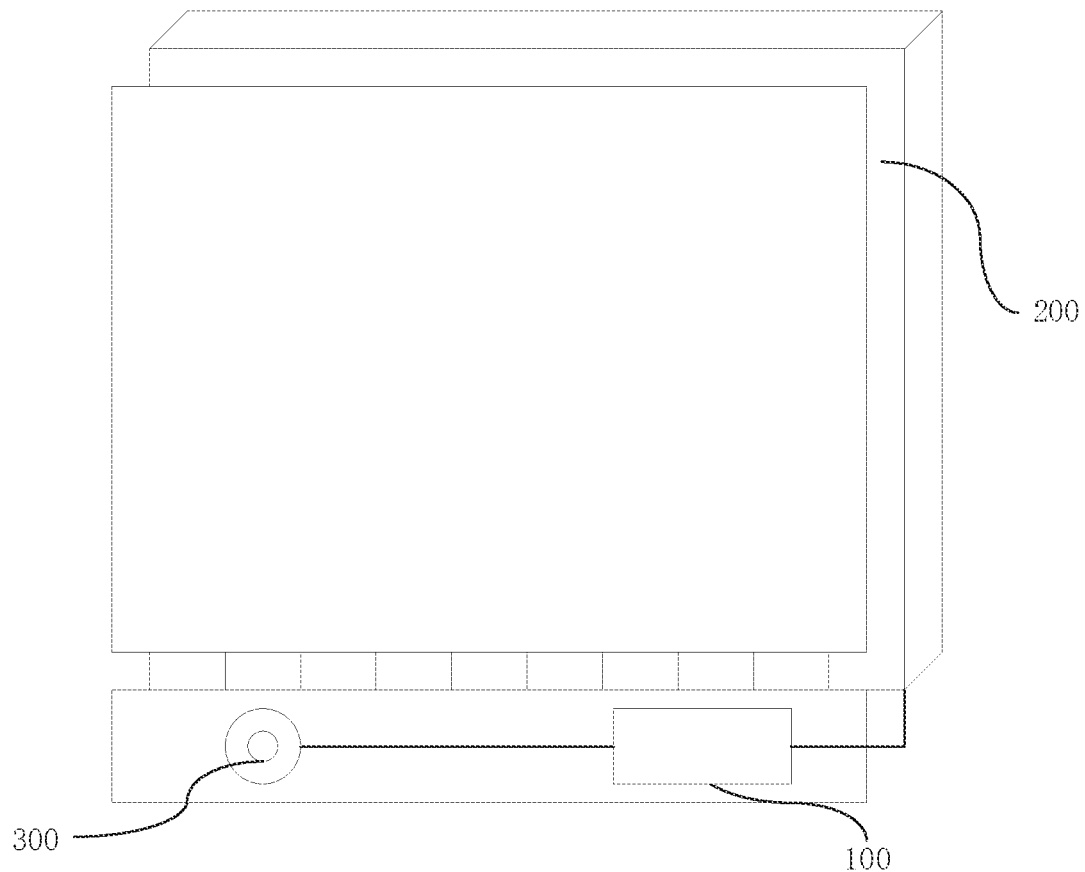
FIG. 1 is an implementation environment diagram of a backlight calibration method provided by one embodiment.

The technical solutions in the embodiments of the present application are clearly and completely described in the following with reference to the accompanying drawings in the embodiments of the present application. Obviously, the described embodiments are only part of the embodiments of the present invention, but are not all embodiments of the present invention. All other embodiments obtained by those skilled in the art based on the embodiments of the present application without creative efforts are within the scope of the present application. Besides, it should be understood that the specific embodiments described herein are merely for describing and explaining the present application and are not intended to limit the present application. In the present application, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

Embodiments of the present application provide a backlight calibration method and relative device, and a storage medium. The details are described below respectively. It should be noted that a description order of the following embodiments is not intended to limit a preferred order of the embodiments.

For making the purposes, technical solutions and effects of the present application be clearer and more definite, the present invention is described in further detail by combining the drawings and embodiments as follow. It should be understood that the specific embodiments described herein are merely for explaining the present invention and are not intended to limit the present invention.

FIG. 1 is an implementation environment diagram of a backlight calibration method provided by one embodiment. As illustrated in FIG. 1, in the implementation environment, a control module 100, a backlight module 200, and a detection module 300 are included.

The control module 100 is a module that is disposed in display equipment and controls other elements of the display equipment, which can be a central processing unit (CPU), a system on chip (SoC), a graphics processing unit (GPU), an integrated circuit, or a control circuit. The backlight module 200 is a module that provides a backlight for the display equipment, and is a backlight source of the display equipment. The detection module 300 is a module configured to obtain backlight parameters of the backlight module 200 and is disposed toward the backlight module 200. In using processes, the control module 100 controls the backlight module 200 to light up, then obtains corresponding backlight parameters through the detection module 300, and then determines the backlight type of the display equipment according to the backlight parameters and corresponds to a mode and parameters of the backlight calibration correspondingly.

It should be noted that the control module 100, the backlight module 200, and the detection module 300 can be connected by wired, wireless or other communication connection methods with each other, which is not limited by the present invention herein.

Figure 2:
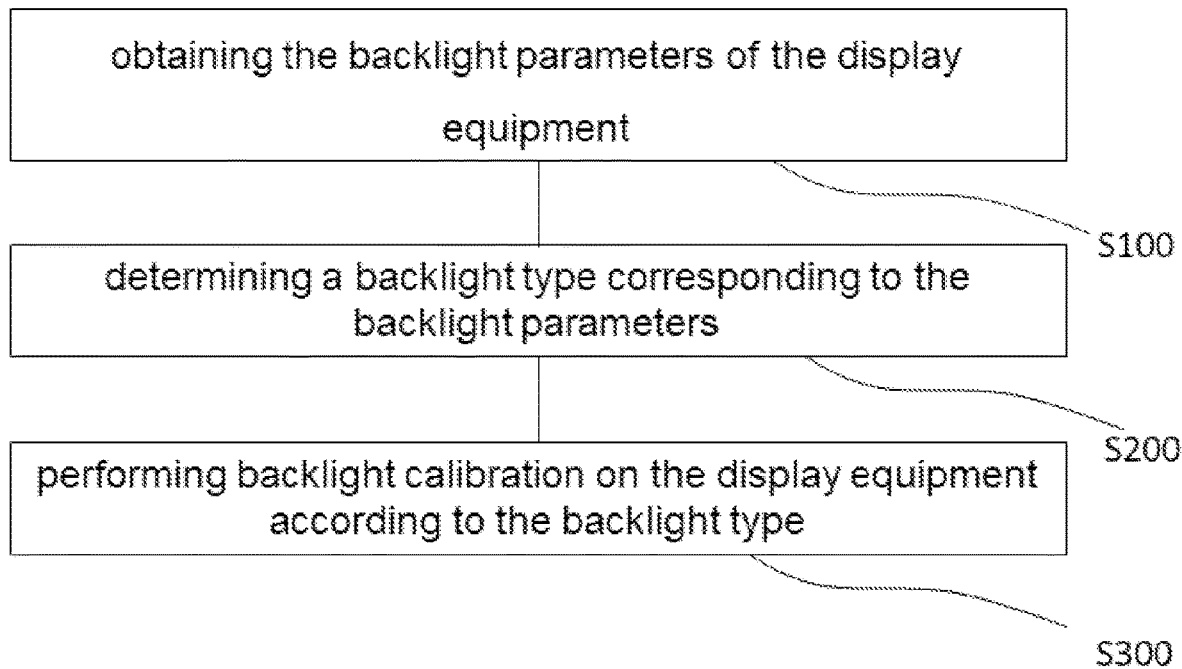
FIG. 2 is a flowchart of one backlight calibration method illustrated according to one exemplary embodiment.

As illustrated in FIG. 2, in one embodiment, a backlight calibration method is provided. The backlight calibration method can be used in the aforesaid control module 100 and can specifically include following steps.

Step S100: obtaining the backlight parameters of the display equipment.

Step S200: determining a backlight type corresponding to the backlight parameters.

Step S300: performing backlight calibration on the display equipment according to the backlight type.

In one embodiment of the present disclosure, when the backlight type used by the display device is determined, the backlight module 200 needs to be lit up first, and then the backlight parameters of the display equipment are collected through the detection module 300. After the corresponding backlight parameters are obtained, the backlight type adopted in the display equipment can be determined according to the backlight parameters, and then the backlight calibration mode can be determined according to the backlight type. When the backlight type is a traditional backlight, the traditional backlight method can be adopted to perform backlight calibration on the display equipment. When the backlight type is the mini-LED backlight, the new backlight calibration method can be adopted to perform backlight calibration on the display equipment.

In the present disclosure, through the aforesaid solution, the backlight type of the display equipment is automatically distinguished, and the technical problem of easily misusing parameters during backlight calibration in the prior art is solved.

Figure 3:
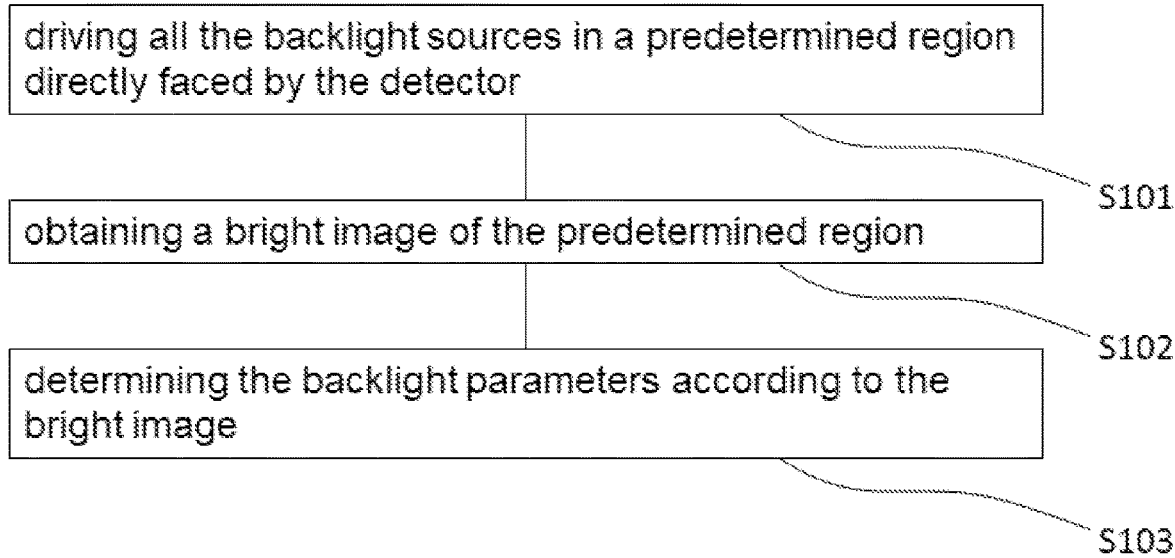
FIG. 3 is a specific implementation flowchart of step S100 in the backlight calibration method illustrated according to one embodiment corresponding to FIG. 2.

Specifically, in some embodiments, a specific embodiment of the step S100 can refer to FIG. 3. FIG. 3 is a detailed description of the step S100 in the backlight calibration method illustrated according to the embodiment corresponding to FIG. 2. In the backlight calibration method, the detection module 300 is a detector that can detect a bright area in a unit area, such as camera equipment, an infrared equipment, etc. The detection module 300 is disposed on a backlight control board of the display equipment. The backlight control board is disposed in a non-display region of the display equipment. The step S100 can include following steps.

Step S101: driving all the backlight sources in a predetermined region directly faced by the detector.

Step S102: obtaining a bright image of the predetermined region.

Step S103: determining the backlight parameters according to the bright image.

In this embodiment, the dependent backlight parameters for judging the backlight type adopted in the display equipment can include at least one of a bright area proportion or brightness density.

Wherein, a method of obtaining the bright area proportion is obtaining the bright image of the backlight sources through the detection module 300 after the backlight sources are lit up, and determining the bright area proportion in the bright image, and then the bright area proportion is obtained.

A method of obtaining the brightness density is obtaining the bright image of the backlight sources through the detection module 300 after the backlight sources are lit up, and determining a density of bright spots in the bright image, and then the brightness density is obtained.

In the aforesaid detection process, the detection module 300 needs to be disposed on the display equipment and the backlight control board. The backlight control board is disposed in a non-display region of the display equipment, and a plurality of backlight sources are disposed in the non-display region.

Figure 4:
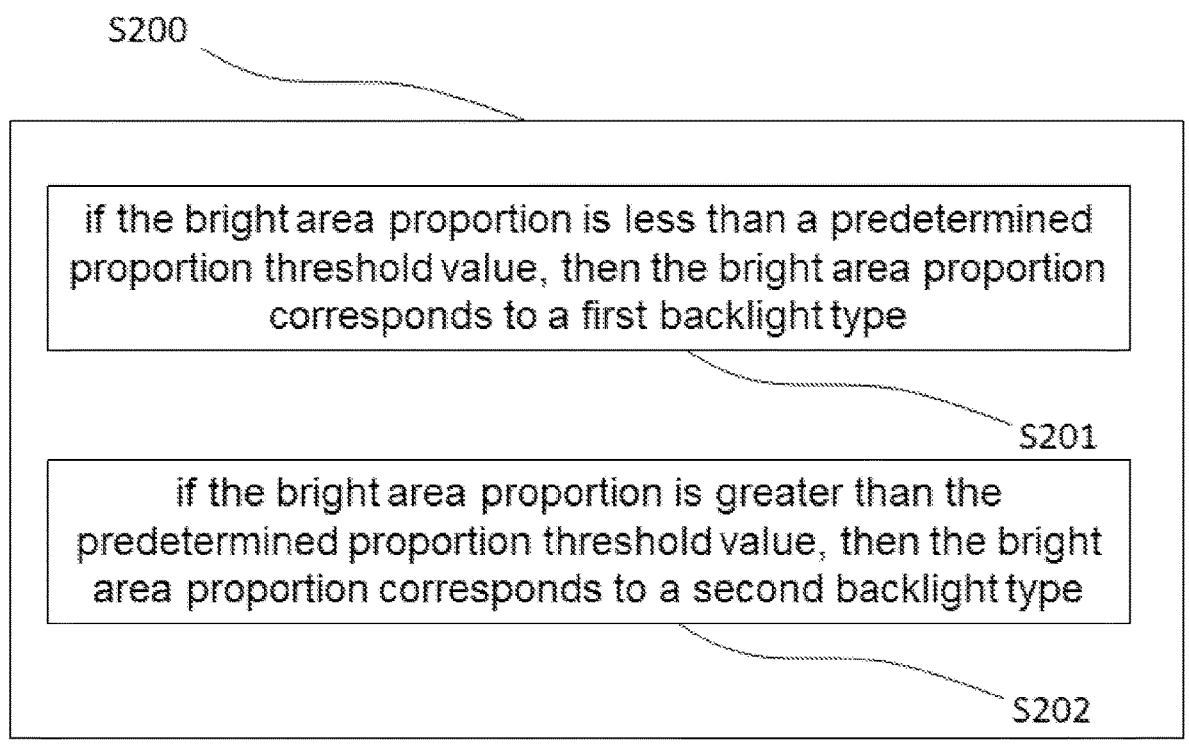
FIG. 4 is a specific implementation flowchart of step S200 in the backlight calibration method illustrated according to one embodiment corresponding to FIG. 3.
Figure 5:
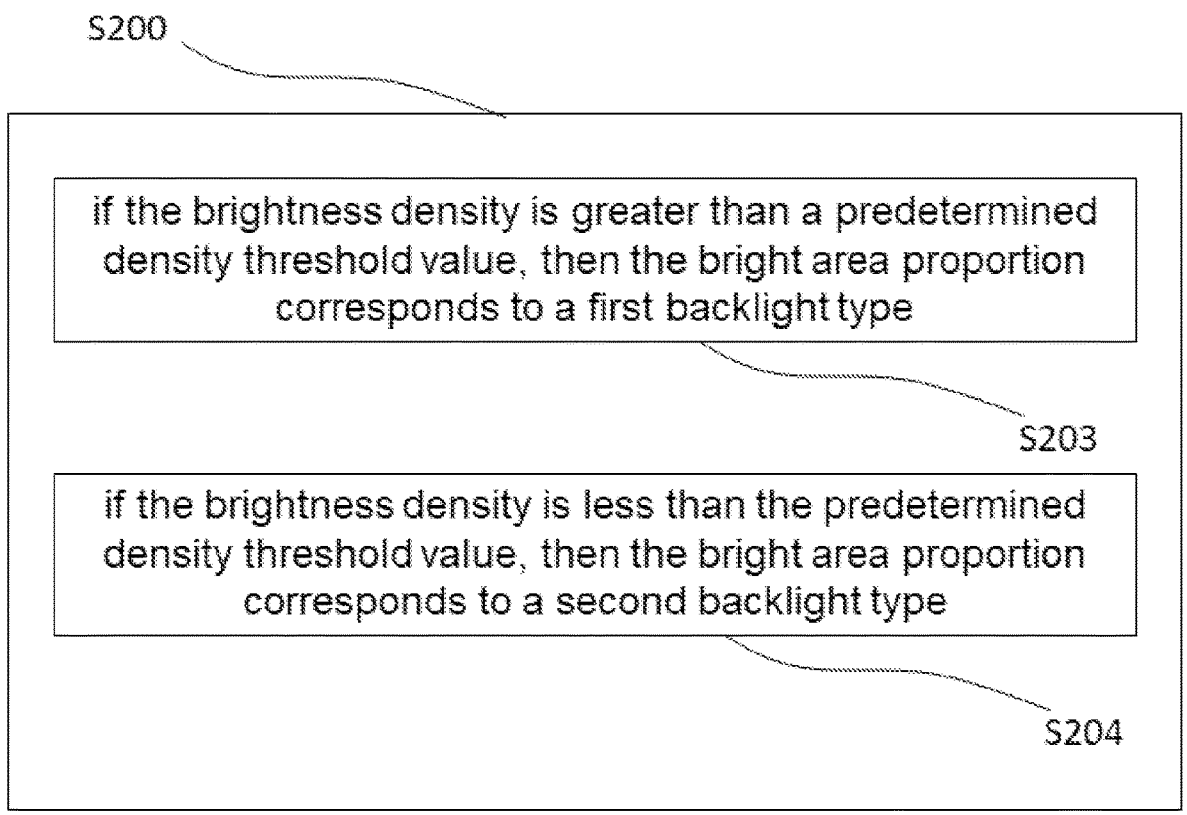
FIG. 5 is another specific implementation flowchart of step S200 in the backlight calibration method illustrated according to one embodiment corresponding to FIG. 3.

After corresponding backlight parameters are obtained, the backlight type corresponding to the backlight parameters can be determined, and Specific methods can refer to embodiments illustrated in FIG. 4 and FIG. 5.

Specifically, in some embodiments, a specific embodiment of the step S200 can refer to FIG. 4. FIG. 4 is a detailed description of the step S200 in the backlight calibration method illustrated according to the embodiment corresponding to FIG. 3. In the backlight calibration method, the backlight parameters includes a bright area proportion. The step S200 can include following steps.

Step S201: if the bright area proportion is less than a predetermined proportion threshold value, then the bright area proportion corresponds to a first backlight type.

Step S202: if the bright area proportion is greater than the predetermined proportion threshold value, then the bright area proportion corresponds to a second backlight type.

In this embodiment, the backlight type used by the display equipment is judged according to whether the bright area proportion is less than the predetermined proportion threshold value.

Compared to traditional backlights, the mini-LED backlights are disposed corresponding to each pixel or sub-pixel, and an area of light generated by the backlights can be narrower compared to the traditional backlights. Therefore, if the bright area proportion is less than the predetermined proportion threshold value, the mini-LED backlights adopted in the display equipment is proved, i.e., the backlight type is the first backlight type, and the corresponding first backlight calibration method needs to be matched to perform the backlight calibration. If the bright area proportion is greater than the predetermined proportion threshold value, the traditional backlights adopted in the display equipment is proved, i.e., the backlight type is the second backlight type, and the traditional second backlight calibration method needs to be matched to perform the backlight calibration at this time.

Wherein, the predetermined proportion threshold value is a basis for judging the backlight type adopted by the display equipment. Because light-dispersing parts, such as diffusion sheets, etc. can used in in traditional backlights, theoretically, the bright area proportion under traditional backlights should be infinitely close to 100%. Furthermore, the mini-LED backlights are disposed corresponding to each pixel or each sub-pixel, so the bright area under the mini-LED backlights is relative to a pixel density. Therefore, the predetermined proportion threshold value can be 95%, 98%, 99%, etc., which is not limited in this disclosure.

Specifically, in some embodiments, a specific embodiment of the step S200 can refer to FIG. 5. FIG. 5 is a detailed description of the step S200 in the backlight calibration method illustrated according to the embodiment corresponding to FIG. 3. In the backlight calibration method, the backlight parameters includes a brightness density. The step S200 can include following steps.

Step S203: if the brightness density is greater than a predetermined density threshold value, then the bright area proportion corresponds to a first backlight type.

Step S204: if the brightness density is less than the predetermined density threshold value, then the bright area proportion corresponds to a second backlight type.

In this embodiment, the backlight type used by the display equipment is judged according to whether the brightness density is greater than the predetermined density threshold value.

Compared to traditional backlights, the mini-LED backlights are disposed corresponding to each pixel or sub-pixel, arrangement of light beads of the backlight is tight and dense and a number of generated light spots is also small and dense. Therefore, if the brightness density is greater than the predetermined density threshold value, the mini-LED backlights adopted in the display equipment is proved, i.e., the backlight type is the first backlight type, and the corresponding first backlight calibration method needs to be matched to perform the backlight calibration at this time. If the brightness density is less than the predetermined density threshold value, the traditional backlights adopted in the display equipment is proved, i.e., the backlight type is the second backlight type, and the traditional second backlight calibration method needs to be matched to perform the backlight calibration at this time. Wherein, the predetermined density threshold value is a basis for judging the backlight type adopted by the display equipment. Because light-dispersing parts, such as diffusion sheets, etc., can used in traditional backlights, theoretically, only one uniform light spot can generate in the traditional backlight, and the brightness density is 1. Furthermore, the mini-LED backlights are disposed corresponding to each pixel or each sub-pixel, so the brightness density under the mini-LED backlights is relative to the pixel density. In a precondition that an area of a region of the bright image obtained by the detection module 300 is not large, the predetermined density threshold value can be 9, 10, 20, etc., which is not limited in the present disclosure.

Figure 6:
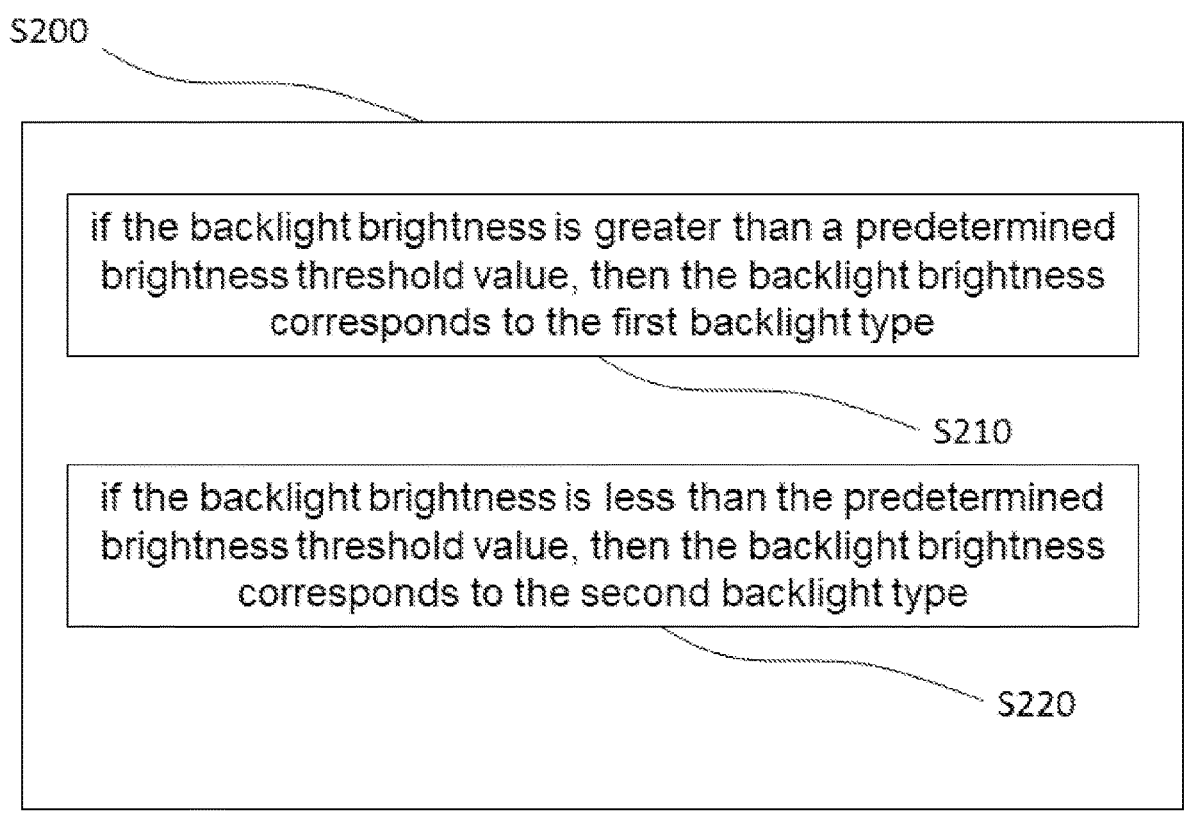
FIG. 6 is a specific implementation flowchart of step S200 in the backlight calibration method illustrated according to one embodiment corresponding to FIG. 2.

Specifically, in some embodiments, a specific embodiment of the step S200 can refer to FIG. 6. FIG. 6 is a detailed description of the step S200 in the backlight calibration method illustrated according to the embodiment corresponding to FIG. 2. The backlight parameters include backlight brightness, and the backlight parameters include the brightness density. The step S200 can include following steps.

Step S210: if the backlight brightness is greater than a predetermined brightness threshold value, then the backlight brightness corresponds to the first backlight type.

Step S220: if the backlight brightness is less than the predetermined brightness threshold value, then the backlight brightness corresponds to the second backlight type.

In this embodiment, backlight type adopted by the display embodiment is judged according to whether the backlight brightness is greater than the predetermined brightness threshold value.

Wherein, a method of obtaining the backlight brightness is obtaining the backlight generated by the backlight module 200 through the detection module 300 with a photosensitive device. The photosensitive device converts the brightness of the backlight into an electrical signal, so the brightness corresponding to the backlight can be obtained.

Compared to traditional backlights, brightness of the mini-LED backlights is higher. Therefore, if the backlight brightness is greater than the predetermined brightness threshold value, the mini-LED backlights adopted in the display equipment is proved, i.e., the backlight type is the first backlight type, and the corresponding first backlight calibration method needs to be matched to perform the backlight calibration at this time. If the backlight brightness is less than the predetermined brightness threshold value, the traditional backlights adopted in the display equipment is proved, i.e., the backlight type is the second backlight type, and the traditional second backlight calibration method needs to be matched to perform the backlight calibration at this time. Wherein, the predetermined brightness threshold value is a basis for judging the backlight type adopted in the display equipment, which value can be 500 nit, 550 nit, 600 nit, etc., and is not limited by the present disclosure herein.

Figure 7:
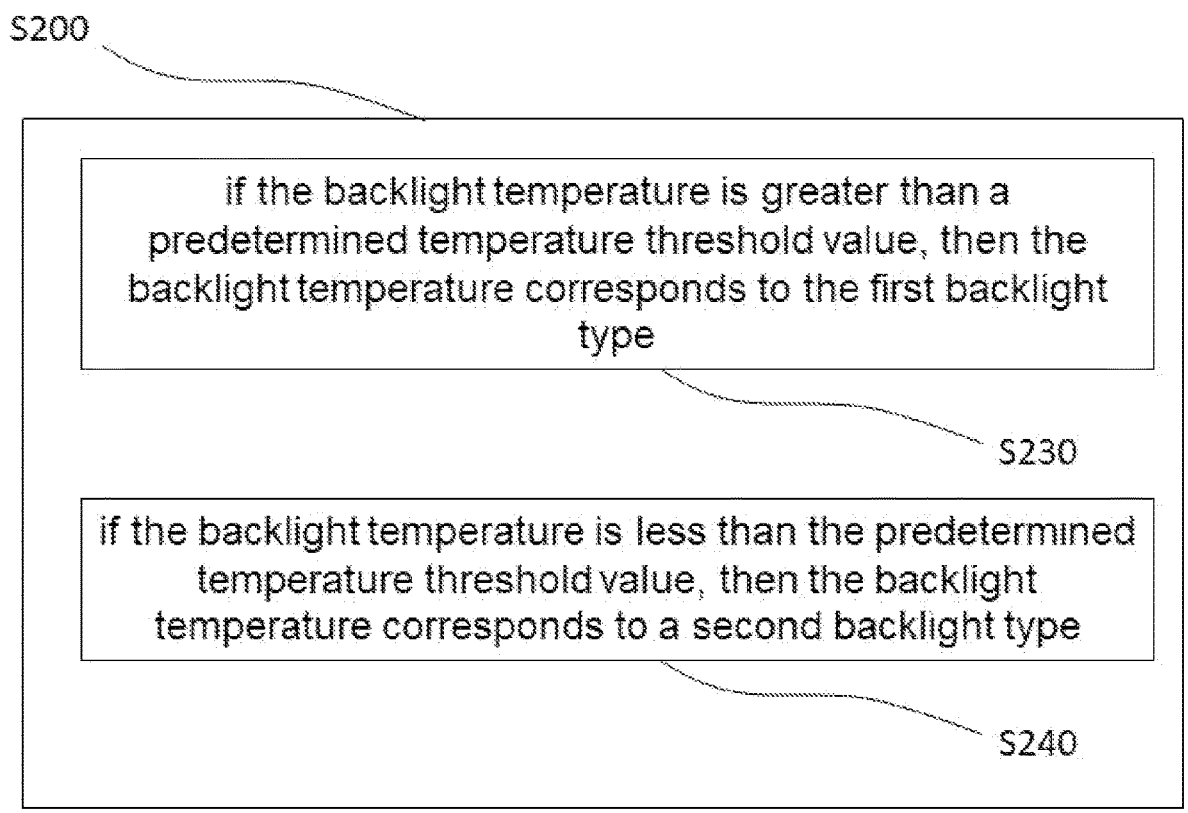
FIG. 7 is another specific implementation flowchart of step S200 in the backlight calibration method illustrated according to one embodiment corresponding to FIG. 2.

Specifically, in some embodiments, a specific embodiment of the step S200 can refer to FIG. 7. FIG. 7 is a detailed description of the step S200 in the backlight calibration method illustrated according to the embodiment corresponding to FIG. 2. The backlight parameters include a backlight temperature, and the backlight parameters include the brightness density. The step S200 can include following steps.

Step S230: if the backlight temperature is greater than a predetermined temperature threshold value, then the backlight temperature corresponds to the first backlight type.

Step S240: if the backlight temperature is less than the predetermined temperature threshold value, then the backlight temperature corresponds to a second backlight type.

In this embodiment, backlight type adopted by the display embodiment is determined according to whether the backlight temperature is greater than the predetermined temperature threshold value.

Wherein, a method of obtaining the backlight brightness is obtaining an environmental temperature around the backlight module 200 through the detection module 300 with a thermosensitive device. The thermosensitive device converts the environmental temperature into an electrical signal, so the backlight temperature corresponding to the backlight can be obtained.

In some other embodiments of the present disclosure, a method of obtaining the backlight brightness can also be obtaining an infrared light wave emitted from the backlight module 200 through the detection module 300 with an infrared component. The infrared component can obtain the backlight temperature corresponding to the backlight according to a wave length by calculating the wave length of the infrared.

Compared to the traditional backlights, the mini-LED backlight generates more heat when it emits light, so the temperature is also higher. Therefore, if the backlight temperature is greater than the predetermined temperature threshold value, the mini-LED backlights adopted in the display equipment is proved, i.e., the backlight type is the first backlight type, and the corresponding first backlight calibration method needs to be matched to perform the backlight calibration at this time. If the backlight temperature is less than the predetermined temperature threshold value, the traditional backlights adopted in the display equipment is proved, i.e., the backlight type is the second backlight type, and the traditional second backlight calibration method needs to be matched to perform the backlight calibration at this time.

Wherein, the predetermined temperature threshold value is a basis for determining the backlight type adopted in the display equipment, which value can be 50 degrees, 60 degrees, etc., and is not limited by the present disclosure herein.

Figure 8:
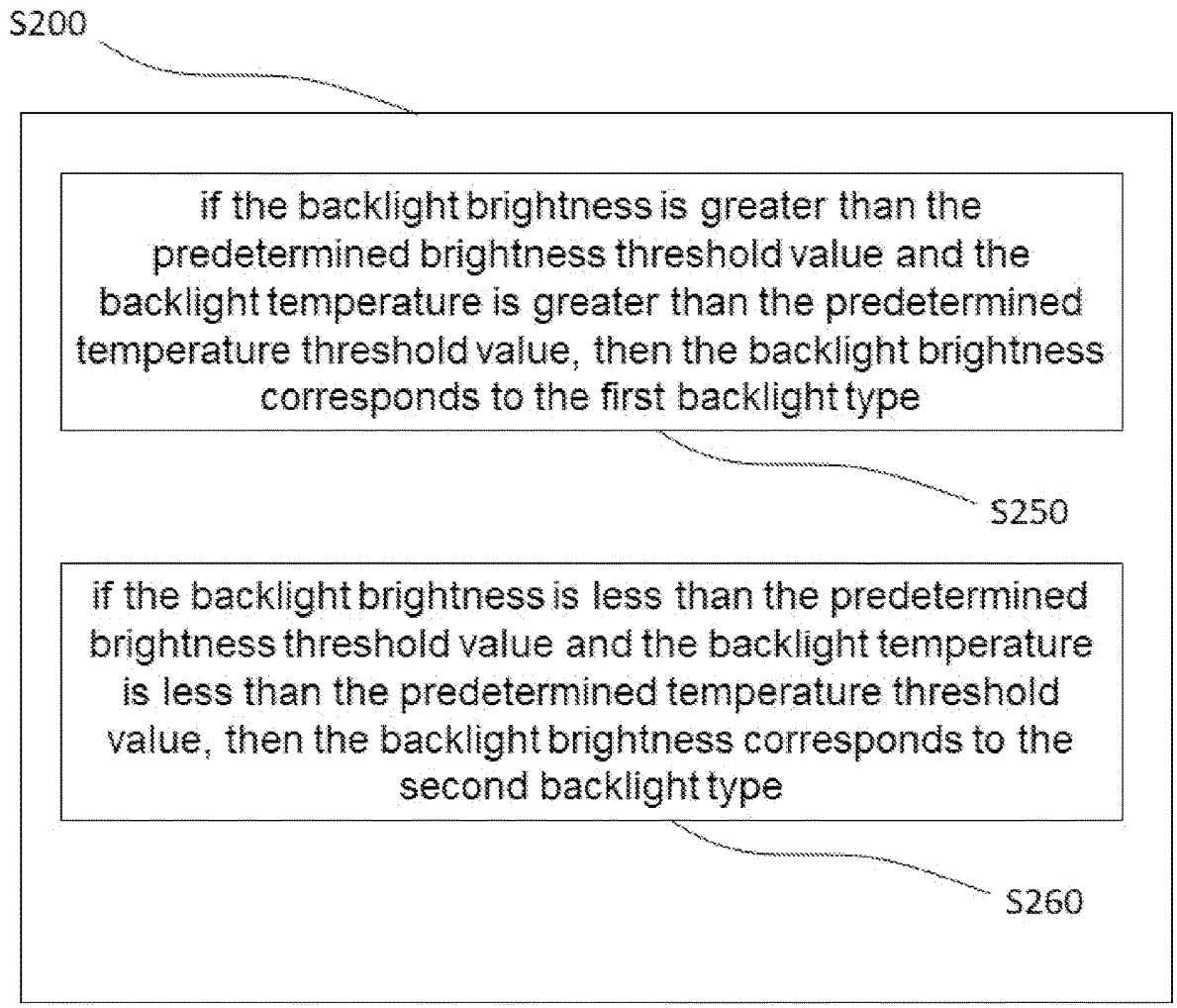
FIG. 8 is still another specific implementation flowchart of step S200 in the backlight calibration method illustrated according to one embodiment corresponding to FIG. 2.

Specifically, in some embodiments, a specific embodiment of the step S200 can refer to FIG. 8. FIG. 8 is a detailed description of the step S200 in the backlight calibration method illustrated according to the embodiment corresponding to FIG. 2. The backlight parameters include the backlight temperature, and the backlight parameters include the brightness density. The step S200 can include following steps.

Step S250: if the backlight brightness is greater than the predetermined brightness threshold value and the backlight temperature is greater than the predetermined temperature threshold value, then the backlight brightness corresponds to the first backlight type.

Step S260: if the backlight brightness is less than the predetermined brightness threshold value and the backlight temperature is less than the predetermined temperature threshold value, then the backlight brightness corresponds to the second backlight type.

In this embodiment, backlight type adopted by the display embodiment is judged according to whether the backlight brightness is greater than the predetermined brightness threshold value and whether the backlight temperature is greater than the predetermined temperature threshold value.

Therefore, if the backlight brightness is greater than the predetermined brightness threshold value, and the backlight temperature is greater than the predetermined temperature threshold value, then the mini-LED backlights adopted in the display equipment is proved, i.e., the backlight type is the first backlight type, and the corresponding first backlight calibration method needs to be matched to perform the backlight calibration at this time. If the backlight brightness is less than the predetermined brightness threshold value, the backlight temperature is less than the predetermined temperature threshold value, the traditional backlights adopted in the display equipment is proved, i.e., the backlight type is the second backlight type, and the traditional second backlight calibration method needs to be matched to perform the backlight calibration at this time. If the measured backlight brightness is less than the predetermined brightness threshold value and the backlight temperature is greater than the predetermined temperature threshold value at the same time; and the backlight brightness is greater than the predetermined brightness threshold value and the backlight temperature is less than the predetermined temperature threshold value at the same time, then it proves that the data is wrong. Another measurement needs to be executed again, or an error alarm is sent to relevant maintenance operators, so that the relevant maintenance operators can check whether fault exists in the display equipment.

In this embodiment, the backlight brightness and backlight temperature are both used as the basis for judging the backlight type of the display equipment, which can further increase accuracy of the determination and can avoid misjudgment. Especially, when one of the measured temperature or brightness is close to the judgement threshold value, another one can be used as a basis for verifying the accuracy of the result. Meanwhile, when the judgement result conflicts, a plurality of measurements can also be performed to correct the judgement result; or an absolute value of the larger difference from the threshold value can be selected as the only basis for judgement; or the error alarm is sent to the relevant maintenance operator, so the relevant maintenance operator can check whether fault exists in the display equipment.

For example, the predetermined temperature threshold value is 50 degrees, the predetermined brightness threshold value is 600 nit, the detection result is that the backlight temperature is 49 degrees, and the backlight brightness is 800 nit. The backlight brightness 800 nit is the only basis for determination, and the test results are sent to the relevant maintenance operator, so that they can confirm whether fault appears in the equipment.

Figure 9:
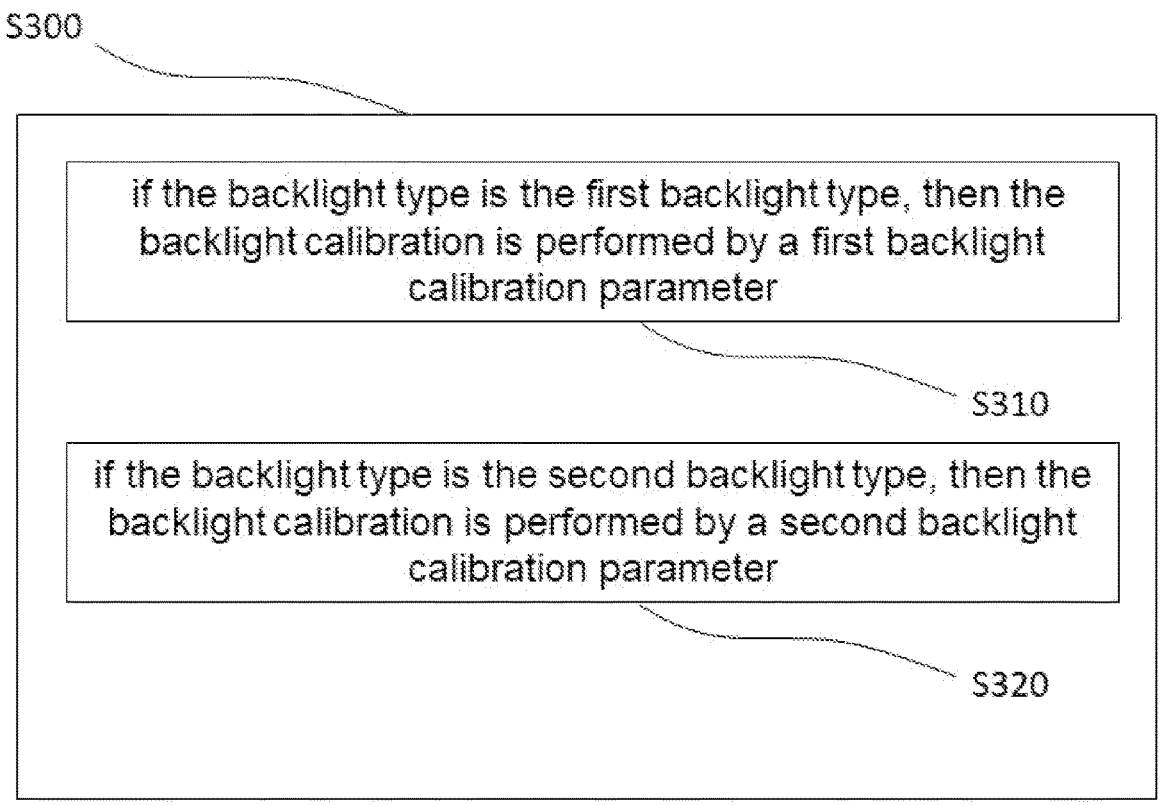
FIG. 9 is a specific implementation flowchart of step S300 in the backlight calibration method illustrated according to one embodiment corresponding to FIG. 2.

Specifically, in some embodiments, a specific embodiment of the step S300 can refer to FIG. 9. FIG. 9 is a detailed description of the step S300 in the backlight calibration method illustrated according to the embodiment corresponding to FIG. 2. The backlight parameters include the backlight temperature, and the backlight parameters include the brightness density. The step S300 can include following steps.

Step S310: if the backlight type is the first backlight type, then the backlight calibration is performed by a first backlight calibration parameter; and S320: if the backlight type is the second backlight type, then the backlight calibration is performed by a second backlight calibration parameter.

Wherein, the first backlight calibration parameter is less than the second backlight calibration parameter.

In this embodiment, when the backlight type is the first backlight type, i.e., the mini-LED backlight, the first backlight calibration method is used. By adopting a relatively small first backlight calibration parameter, change of a binding-point register value from a driver is controlled in a relatively small amplitude, so an adjustment range of brightness of a binding point is made to be in a relatively small range, thereby making the adjustment range of grayscale brightness also be in a relatively small range. Thus, overall calibration range of the screen being not large is ensured, and overall washout of the screen after calibration affecting display effect is avoided. When the backlight type is the second backlight type, i.e., the traditional backlight, the second backlight calibration method is used. By adopting a traditional second backlight calibration parameter, change of the binding-point register value from the driver is controlled in a normal amplitude, and overall calibration amplitude of the screen is ensured to be normal. wherein the aforesaid first backlight calibration parameter and second backlight calibration parameter are different gamma calibration parameters.

Figure 10:
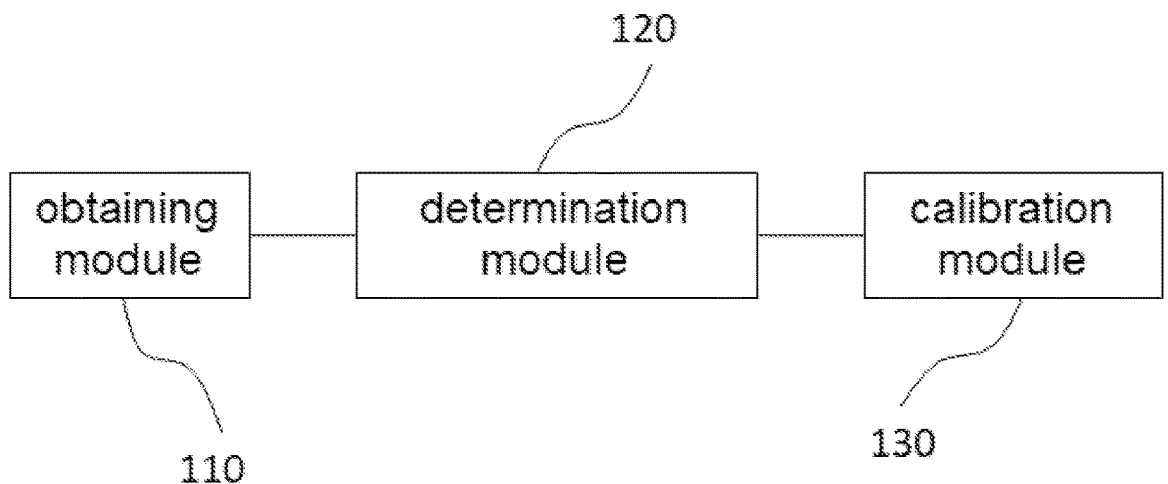
FIG. 10 is a block diagram of a backlight calibration device illustrated according to one exemplary embodiment.

As illustrated in FIG. 10, in one embodiment, a backlight calibration device is provided. The backlight calibration device can be integrated in the control module 100, and can specifically include an obtaining module 110, a determination module 120, and a calibration module 130.

The obtaining module 110 is configured to obtain the backlight parameters of the display equipment.

The determination module 120 is configured to determine the backlight type corresponding to the backlight parameters.

The calibration module 130 is configured to perform the backlight calibration on the display equipment according to the backlight type.

Optionally, the detector is disposed on a backlight control board of the display equipment, and the backlight control board is disposed in a non-display region of the display equipment. The obtaining module 110 specifically includes:
    a driving unit configured to drive all the backlight sources in a predetermined region directly faced by the detector;
    an obtaining unit configured to obtain a bright image of the predetermined region; and
    a determining unit configured to determine the backlight parameters according to the bright image.

Optionally, the determination module 120 specifically includes:
    a first proportion corresponding unit configured to make the bright area proportion correspond to a first backlight type, if the bright area proportion is less than a predetermined proportion threshold value; and
    a second proportion corresponding unit configured to make the bright area proportion correspond to a second backlight type, if the bright area proportion is greater than the predetermined proportion threshold value.

Optionally, the backlight parameters include backlight brightness. The determination module 120 specifically includes:
    a first brightness corresponding unit configured to make the backlight brightness correspond to a first backlight type if the backlight brightness is greater than a predetermined brightness threshold value; and
    a second brightness corresponding unit configured to make the backlight brightness correspond to a second backlight type if the backlight brightness is less than the predetermined brightness threshold value.

Optionally, the backlight parameters include a backlight temperature. The determination module 120 specifically includes:
    a first temperature corresponding unit configured to make the backlight temperature correspond to a first backlight type, if the backlight temperature is greater than a predetermined temperature threshold value; and
    a second temperature corresponding unit configured to make the backlight temperature correspond to a second backlight type, if the backlight temperature is less than the predetermined temperature threshold value.

Optionally, the backlight parameters include backlight brightness and a backlight temperature. The determination module 120 specifically includes:
    a first comprehensively corresponding unit configured to make the backlight brightness correspond to a first backlight type, if the backlight brightness is greater than a predetermined brightness threshold value and the backlight temperature is greater than the predetermined temperature threshold value;

a second comprehensively corresponding unit configured to make the backlight brightness correspond to a second backlight type, if the backlight brightness is less than the predetermined brightness threshold value and the backlight temperature is less than the predetermined temperature threshold value.

Optionally, the calibration module 130 specifically includes:

a first calibration unit configured to perform the backlight calibration by a first backlight calibration parameter, if the backlight type is the first backlight type; and a second calibration unit configured to perform the backlight calibration by a second backlight calibration parameter, if the backlight type is the second backlight type; and wherein the first backlight calibration parameter is less than the second backlight calibration parameter.

It should be noted that although several modules or units of the equipment for action execution are mentioned in the above detailed description, this division is not mandatory. Actually, according to the implementations of the present disclosure, features and functions of the two or more modules or units described above may be embodied in one module or unit. Conversely, the features and functions of one module or unit described above may be further divided into a plurality of modules or units to be embodied.

In addition, although the steps of the method in the present disclosure are described in the accompanying drawings in a specific sequence, this does not require or imply that these steps need to be performed according to the specific sequence, or all shown steps need to be performed to achieve an expected result. Additionally or alternatively, some steps may be omitted, a plurality of steps are combined into one step, and/or one step is decomposed into a plurality of steps for execution, and the like.

Through the description of the aforesaid embodiments, a person of ordinary skill in the art can easily understand that the exemplary embodiments described herein may be implemented by software, or may be implemented by combining software with necessary hardware. Therefore, the technical solutions of the equipments of the present disclosure may be implemented in the form of a software product. The software product may be stored in a non-volatile storage medium (which may be a CD-ROM, a USB flash drive, a removable hard disk, or the like) and includes several instructions for instructing a computer device (which may be a personal computer, a server, a mobile terminal, a network device, or the like) to execute the methods described in the embodiments of the present disclosure.

In one exemplary equipment, an electronic equipment able to realize the aforesaid method is provided.

Those skilled in the art can understand that, various aspects of the present invention can be implemented as a system, a method or a program product. Therefore, various aspects of the present invention can be specifically implemented as following forms, i.e., a pure hardware implementation method, a pure software pure hardware implementation method (including firmware, microcode, etc.), or a combination pure hardware implementation method of hardware and software, which can be collectively referred to herein as circuit, module or system.

The electronic device 500 according to this embodiment of the present invention will be described with reference to FIG. 11 as follow. The electronic device 500 illustrated in FIG. 11 is only an example, and should not make any limitation to the function and scope of use of the embodiments of the present invention.

Figure 11:
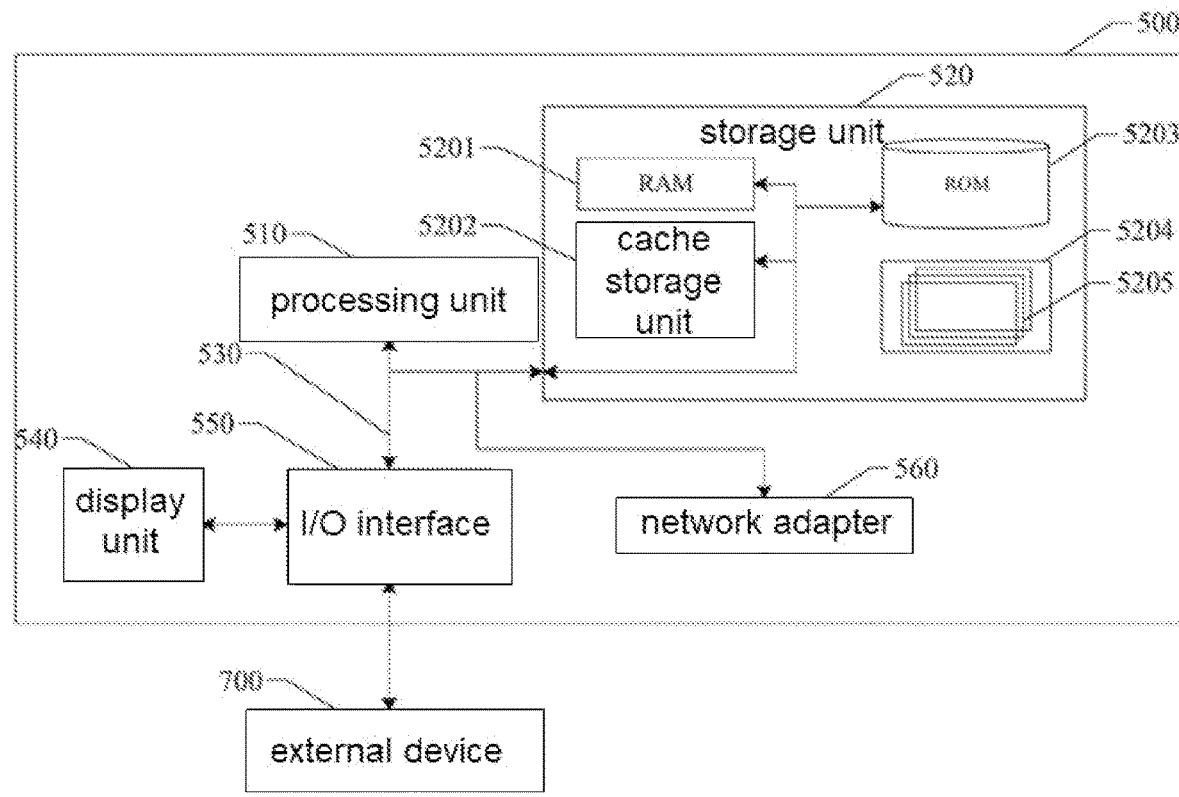
FIG. 11 schematically shows a block diagram of an example of electronic equipment configured to implement the aforesaid backlight calibration method.

As illustrated in FIG. 11, electronic device 500 performs in a form of a general computing device. Components of the electronic device 500 can include, but are not limited to: the aforesaid at least one processing unit 510, the aforesaid at least one storage unit 520, a bus 530 that connects different system components (including the storage unit 520 and the processing unit 510), and a display unit 540.

Wherein, a program code is stored in the storage unit. The program code can be executed by the processing unit 510 to make the processing unit 510 execute the steps according to various exemplary embodiments of the present invention described in the above "exemplary method" section of this specification. For example, the processing unit 510 can execute step S100 illustrated in FIG. 2 to obtain the backlight parameters of the display equipment. Step S200: determining a backlight type corresponding to the backlight parameters. Step S300: performing backlight calibration on the display equipment according to the backlight type.

The storage unit 520 can include a readable medium in the form of a volatile storage unit, for example, a random access memory (RAM) 5201 and/or a cache storage unit 5202, and can further include a read-only memory (ROM) 5203.

The storage unit 520 can further include a program/utility tool 5204 including a group of (at least one) program modules 5205, and such program modules 5205 include but are not limited to: an operating system, one or more application programs, other program modules, and program data. Each or certain combination of these examples can include implementation of a network environment.

The bus 530 can be one or more of several types of bus structures, including a storage unit bus or a storage unit controller, a peripheral bus, a graphics acceleration port, a processing unit, or a local bus using any of various bus structures.

The electronic device 500 can also communicate with one or more external devices 700 (for example, a keyboard, a pointing device, a bluetooth device, etc.), and can also communicate with one or more equipment that enable a user to interact with the electronic device 500, and/or communicate with any equipment (for example, a router, a modem, etc.) that enables the electronic device 500 to communicate with one or more other computing equipment. This communication can be executed through an input/output (I/O) interface 550. Furthermore, the electronic device 500 can also communicate with one or more networks (for example, a local area network (LAN), a wide area network (WAN) and/or a public network such as the Internet) through a network adapter 560. As illustrated in the figure, the network adapter 560 can communicate with other modules of the electronic device 500 through the bus 530. It should be understood that although not shown in the figures, other hardware and/or software modules can be used in conjunction with the electronic device 500, including but not limited to: a microcode, a device driver, a redundancy processing unit, an external magnetic disk driving array, a redundant array of independent disks (RAID) system, a magnetic tape drive, and a data backup storage system, etc.

Through the description of the aforesaid embodiments, a person of ordinary skill in the art can easily understand that the exemplary embodiments described herein may be implemented by software, or may be implemented by combining software with necessary hardware. Therefore, the technical solutions of the equipments of the present disclosure may be implemented in the form of a software product. The software product may be stored in a non-volatile storage medium (which may be a CD-ROM, a USB flash drive, a removable hard disk, or the like) and includes several instructions for instructing a computer device (which may be a personal computer, a server, a mobile terminal, a network device, or the like) to execute the methods described in the embodiments of the present disclosure.

In an exemplary embodiment of the present disclosure, a computer readable storage medium is further provided, on which a program product capable of implementing the above method of this specification is stored. In some possible implementations, various aspects of the present invention can also be implemented in the form of a program product, which includes program codes, and when the program product runs on terminal equipment, the program codes are used to enable the terminal equipment to execute the steps according to various exemplary embodiments of the present invention described in the "exemplary method" section of the present specification.

Figure 12:
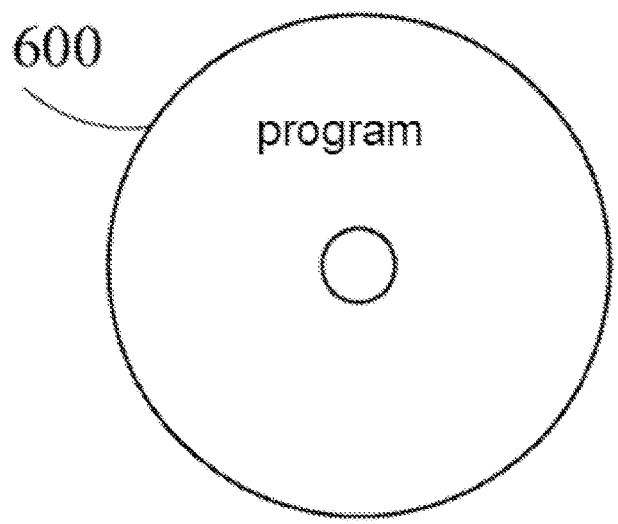
FIG. 12 schematically shows a computer readable storage medium configured to realize the aforesaid backlight calibration method.

Please refer to FIG. 12, a program product 600 for realizing the aforesaid method according to one embodiment of the present invention is described, which can employ a portable compact disk read-only memory (CD-ROM) and include program codes, and can be included in the terminal device, for example, executed on a personal computer. However, the program product of the present disclosure is not limited thereto. In this document, the readable storage medium can be any tangible medium including or storing a program. The program can be used by or in combination with an instruction execution system, apparatus, or device.

Any combination of a plurality of readable medium can be adopted in the program product. The readable medium can be a readable signal medium or a readable storage medium. The readable storage medium can be, for example but not limited to, an electrical, magnetic, optical, electromagnetic, infrared, or semiconductor system, device, or any combination thereof. More specific examples of the readable storage medium (non-exhaustive list) include: electrical connections with one or more wires, portable disks, hard disks, random access memory (RAM), read only memory (ROM), erasable programmable read-only memory (EPROM or flash memory), optical fiber, portable compact disk read-only memory (CD-ROM), optical storage device, magnetic storage device, or any aforesaid suitable combination.

The computer-readable signal medium can include a data signal that is transmitted in a baseband or as a part of a carrier wave, in which readable program code is carried. Various forms can be adopted in this propagated data signal, including but not limited to electromagnetic signals, optical signals, or any aforesaid suitable combination. The readable signal medium can also be any readable medium other than a readable storage medium. The readable medium can send, propagate, or transmit a program for use by or in combination with an instruction execution system, apparatus, or device.

The program code included in the readable medium can be transmitted using any appropriate medium, including but not limited to wireless, wired, optical fiber cable, RF, etc., or any aforesaid suitable combination.

Program codes for executing operations of the present invention can be written in any combination of a plurality of programming languages including object-oriented programming languages such as Java, C++, etc., as well as conventional procedural programming language, such as "C" language or similar programming language. The program codes can be executed entirely in a user's computing equipment, partly in the user's equipment, as an independent software package, partly in the user's computing equipment and partly in a remote computing equipment, or entirely in the remote computing equipment or server for implementation. In situations relating to remote computing equipment, the remote computing equipment can be connected to the user computing equipment through any kind of network, including a local area network (LAN) or a wide area network (WAN), or can be connected to an external computing equipment (for example, using Internet service to connect via the Internet).

In addition, the aforesaid drawings are only schematic illustrations of the processing included in the method according to the exemplary embodiment of the present invention, but are not intended to limit the purpose. It can be easily understood that the processes shown in the aforesaid drawings do not indicate or limit the chronological order of these processes. In addition, it is also easily to understand that these processes can be, for example, performed synchronously or asynchronously in multiple modules. The backlight calibration method and device, and the computer equipment provided by the embodiments of the present disclosure are described in detail. This article uses specific cases for describing the principles and the embodiments of the present disclosure, and the description of the embodiments mentioned above is only for helping to understand the method and the core idea of the present disclosure. Meanwhile, for those skilled in the art, will have various changes in specific embodiments and application scopes according to the idea of the present disclosure. In summary, the content of the specification should not be understood as limit to the present disclosure.

What is claimed is:

1. A backlight calibration method, wherein the backlight calibration method is used in display equipment, a detector is disposed in the display equipment, the detector is disposed toward backlight sources of the display equipment to detect backlight parameters of the backlight sources, wherein the method comprises:

obtaining the backlight parameters of the backlight sources;

determining a backlight type corresponding to the backlight parameters; and performing backlight calibration on the display equipment according to the backlight type;

wherein the detector is disposed on a backlight control board of the display equipment, the backlight control board is disposed in a non-display region of the display equipment, and the display equipment comprises a plurality of backlight sources; and wherein obtaining the backlight parameters of the backlight sources comprises:

driving all the backlight sources in a predetermined region directly faced by the detector;

obtaining a bright image of the predetermined region; and determining the backlight parameters according to the bright image;

wherein the backlight parameters comprise a bright area proportion, and wherein determining the backlight type corresponding to the backlight parameters comprises:

if the bright area proportion is less than a predetermined proportion threshold value, then the bright area proportion corresponds to a first backlight type; and if the bright area proportion is greater than the predetermined proportion threshold value, then the bright area proportion corresponds to a second backlight type.

2. The backlight calibration method as claimed in claim 1, wherein the backlight parameters comprise backlight brightness, and wherein determining the backlight type corresponding to the backlight parameters comprises:
- if the backlight brightness is greater than a predetermined brightness threshold value, then the backlight brightness corresponds to a first backlight type; and
- if the backlight brightness is less than the predetermined brightness threshold value, then the backlight brightness corresponds to a second backlight type.

3. The backlight calibration method as claimed in claim 1, wherein the backlight parameters comprise a backlight temperature, wherein determining the backlight type corresponding to the backlight parameters comprises:
- if the backlight temperature is greater than a predetermined temperature threshold value, then the backlight temperature corresponds to a first backlight type; and
- if the backlight temperature is less than the predetermined temperature threshold value, then the backlight temperature corresponds to a second backlight type.

4. The backlight calibration method as claimed in claim 1, wherein the backlight parameters comprise backlight brightness and a backlight temperature, wherein determining the backlight type corresponding to the backlight parameters comprises:
- if the backlight brightness is greater than a predetermined brightness threshold value and the backlight temperature is greater than the predetermined temperature threshold value, then the backlight brightness corresponds to a first backlight type; and
- if the backlight brightness is less than the predetermined brightness threshold value and the backlight temperature is less than the predetermined temperature threshold value, then the backlight brightness corresponds to a second backlight type.

5. The backlight calibration method as claimed in claim 1, wherein performing the backlight calibration on the display equipment according to the backlight type comprises:
- if the backlight type is the first backlight type, then a first backlight calibration method is used, and the backlight calibration is performed by a first backlight calibration parameter;
- if the backlight type is the second backlight type, then the second backlight calibration method is used, and the backlight calibration is performed by a second backlight calibration parameter, and
- wherein the first backlight calibration parameter is less than the second backlight calibration parameter.

6. A backlight calibration device, wherein a detector is disposed in the display equipment, the detector is disposed toward backlight sources of the display equipment to detect backlight parameters of the backlight sources; wherein the backlight calibration device comprises:
- an obtaining module configured to obtain the backlight parameters of the backlight sources;
- a determination module configured to determine a backlight type corresponding to the backlight parameters; and
- a calibration module configured to perform backlight calibration on the display equipment according to the backlight type;
- wherein the detector is disposed on a backlight control board of the display equipment, the backlight control board is disposed in a non-display region of the display equipment, and wherein the obtaining module comprises:
- a driving unit configured to drive all the backlight sources in a predetermined region directly faced by the detector; an obtaining unit configured to obtain a bright image of the predetermined region; and
- a determining unit configured to determine the backlight parameters according to the bright image;
- wherein the backlight parameters comprise a bright area proportion, and wherein the determination module comprises:
- a first proportion corresponding unit configured to make the bright area proportion correspond to a first backlight type, if the bright area proportion is less than a predetermined proportion threshold value; and
- a second proportion corresponding unit configured to make the bright area proportion correspond to a second backlight type, if the bright area proportion is greater than the predetermined proportion threshold value.

7. The backlight calibration device as claimed in claim 6, wherein the backlight parameters comprise backlight brightness, and wherein the determination module comprises:
- a first brightness corresponding unit configured to make the backlight brightness correspond to a first backlight type if the backlight brightness is greater than a predetermined brightness threshold value; and
- a second brightness corresponding unit configured to make the backlight brightness correspond to a second backlight type if the backlight brightness is less than the predetermined brightness threshold value.

8. The backlight calibration device as claimed in claim 6, wherein the backlight parameters comprise a backlight temperature, wherein the determination module comprises:
- a first temperature corresponding unit configured to make the backlight temperature correspond to a first backlight type, if the backlight temperature is greater than a predetermined temperature threshold value; and
- a second temperature corresponding unit configured to make the backlight temperature correspond to a second backlight type, if the backlight temperature is less than the predetermined temperature threshold value.

9. The backlight calibration device as claimed in claim 6, wherein the backlight parameters comprise backlight brightness and a backlight temperature, wherein the determination module comprises:
- a first comprehensively corresponding unit configured to make the backlight brightness correspond to a first backlight type, if the backlight brightness is greater than a predetermined brightness threshold value and the backlight temperature is greater than the predetermined temperature threshold value;
- a second comprehensively corresponding unit configured to make the backlight brightness correspond to a second backlight type, if the backlight brightness is less than the predetermined brightness threshold value and the backlight temperature is less than the predetermined temperature threshold value.

10. The backlight calibration device as claimed in claim 6, wherein the calibration module comprises:
- a first calibration unit configured to perform the backlight calibration by a first backlight calibration parameter, if the backlight type is the first backlight type; and
- a second calibration unit configured to perform the backlight calibration by a second backlight calibration parameter, if the backlight type is the second backlight type; and
- wherein the first backlight calibration parameter is less than the second backlight calibration parameter.

11. A computer equipment, wherein the computer equipment comprises:
- at least one processor;

a storage appliance; and at least one application program, where in the at least one application program is stored in the storage appliance and is configured to execute following steps by the processor:

obtaining the backlight parameters of the backlight sources;

determining a backlight type corresponding to the backlight parameters; and performing backlight calibration on the display equipment according to the backlight type;

wherein a detector is disposed on a backlight control board of the display equipment, the backlight control board is disposed in a non-display region of the display equipment, and the display equipment comprises a plurality of backlight sources; and wherein in the step of obtaining the backlight parameters of the backlight sources, the processor executes following steps:

driving all the backlight sources in a predetermined region directly faced by the detector;

obtaining a bright image of the predetermined region; and determining the backlight parameters according to the bright image;

wherein the backlight parameters comprise a bright area proportion, and wherein in the step of determining the backlight type corresponding to the backlight parameters, the processor execute following steps:

if the bright area proportion is less than a predetermined proportion threshold value, then the bright area proportion corresponds to a first backlight type; and if the bright area proportion is greater than the predetermined proportion threshold value, then the bright area proportion corresponds to a second backlight type.

12. The computer equipment as claimed in claim 11, wherein the backlight parameters comprise backlight brightness, and wherein in the step of determining the backlight type corresponding to the backlight parameters, the processor execute following steps:

if the backlight brightness is greater than a predetermined brightness threshold value, then the backlight brightness corresponds to a first backlight type; and if the backlight brightness is less than the predetermined brightness threshold value, then the backlight brightness corresponds to a second backlight type.

13. The computer equipment as claimed in claim 11, wherein the backlight parameters comprise a backlight temperature, wherein in the step of determining the backlight type corresponding to the backlight parameters, the processor execute following steps:

if the backlight temperature is greater than a predetermined temperature threshold value, then the backlight temperature corresponds to a first backlight type; and if the backlight temperature is less than the predetermined temperature threshold value, then the backlight temperature corresponds to a second backlight type.

14. The computer equipment as claimed in claim 11, wherein the backlight parameters comprise backlight brightness and a backlight temperature, wherein in the step of determining the backlight type corresponding to the backlight parameters, the processor execute following steps:

if the backlight brightness is greater than a predetermined brightness threshold value and the backlight temperature is greater than the predetermined temperature threshold value, then the backlight brightness corresponds to a first backlight type; and if the backlight brightness is less than the predetermined brightness threshold value and the backlight temperature is less than the predetermined temperature threshold value, then the backlight brightness corresponds to a second backlight type.

\* \* \* \* \*